US008185362B2

(12) United States Patent
Matos et al.

(10) Patent No.: US 8,185,362 B2
(45) Date of Patent: May 22, 2012

(54) INTEGRATION OF FAST FEEDBACK INTO SYSTEMS CONFIGURATION

(75) Inventors: Gilberto Augusto Matos, Plainsboro, NJ (US); Bradley Wehrwein, Princeton, NJ (US); Rajanikanth Tanikella, Princeton, NJ (US); Franz Spanfelner, Moosburg (DE)

(73) Assignee: Siemens Corporation, Iselin, NJ (US)

( * ) Notice: Subject to any disclaimer, the term of this patent is extended or adjusted under 35 U.S.C. 154(b) by 703 days.

(21) Appl. No.: 12/079,693

(22) Filed: Mar. 28, 2008

(65) Prior Publication Data
US 2008/0275687 A1 Nov. 6, 2008

Related U.S. Application Data

(60) Provisional application No. 60/915,136, filed on May 1, 2007.

(51) Int. Cl.
G06F 17/50 (2006.01)
G06F 19/00 (2011.01)
(52) U.S. Cl. .................. 703/2; 703/5; 703/13; 700/17; 700/83; 700/96; 345/619
(58) Field of Classification Search .................. 703/2, 5, 703/22, 24; 700/83, 96, 17; 345/619
See application file for complete search history.

(56) References Cited

U.S. PATENT DOCUMENTS

| 7,210,138 | B2 | 4/2007 | Zatloukal et al. | |
|---|---|---|---|---|
| 7,213,227 | B2 | 5/2007 | Kompalli et al. | |
| 7,296,264 | B2 | 11/2007 | Zatloukal et al. | |
| 7,680,546 | B2 * | 3/2010 | Gilbert et al. | 700/17 |
| 7,702,409 | B2 * | 4/2010 | Lucas et al. | 700/96 |
| 2007/0132779 | A1 * | 6/2007 | Gilbert et al. | 345/619 |
| 2007/0165931 | A1 * | 7/2007 | Higaki | 382/128 |
| 2007/0179641 | A1 * | 8/2007 | Lucas et al. | 700/83 |
| 2007/0211079 | A1 * | 9/2007 | Nixon et al. | 345/619 |

* cited by examiner

Primary Examiner — Thai Phan

(57) ABSTRACT

A configuration operation set for configuring a system element is tested by simulating execution of the control operation set with simulation sample test data. The configuration operation set is received via a configuration user interface in a configuration view. Simulation sample test data is received via a simulation user interface in a simulation view. The configuration view and the simulation view may be simultaneously viewed on a display. In a single session, a control operation set may be received, simulation sample test data may be received, a simulation may be run, and the results of the simulation may be viewed. If the results of the simulation agree with expected results, the control operation set may be saved, and executed in the system element of interest. If the results of the simulation do not agree with the expected results, the control operation set may be cancelled.

25 Claims, 4 Drawing Sheets

INTEGRATION OF FAST FEEDBACK INTO SYSTEMS CONFIGURATION

This application claims the benefit of U.S. Provisional Application No. 60/915,136 filed May 1, 2007, which is incorporated herein by reference.

BACKGROUND OF THE INVENTION

The present invention relates generally to systems configuration, and more particularly to integration of fast feedback into systems configuration.

Software control of complex systems has become prevalent. Examples may be drawn from a diverse range of applications. In the telecommunications field, the operations, administration, maintenance, and provisioning (OAM&P) of large-scale networks, for example, may be heavily dependent on software control. Activities may range from configuration of switches to handling of alarms to customer billing. In the chemical engineering field, operation of a processing plant, for example, may be heavily dependent on software control. Process variables such as flow rates, temperature, pressure, and time interval may all be controlled by software. A third example is in finance. Computerized transaction systems may provide near-real-time stock trades.

Although software control may automate the majority of processes in a complex system, user input is typically needed at various stages to configure (and re-configure) parts of the system. The frequency and complexity of user input varies widely with the application. For example, in a chemical plant, process variables may be quasistatic. In a telecommunications system, switch settings may need to be programmed every time a new customer is added. In a stock exchange, frequent user input is the norm for trades by individuals. Consequently, the user interface (UI) may be a critical component of a software control system.

In some applications, the user input may include the selection of an option from a small, fixed set of options. In telecommunications, for example, a network operation may be "Activate router port 45", with input parameters "Yes/No". In financial transactions, for example, the application may be "Display transaction history", with input parameters "Last week/Last Month/Last Year". In these instances, a graphical user interface (GUI) with a point-and-click selection of input parameter may suffice. In other applications, however, a user may need to enter extended character strings, in a format and syntax specified by the software control system. A common example is entry of a telephone number. In the US, a standard format is "(abc)def-hijk", where the letters represent integers 0-9. In some computer transaction systems, however, the phone number must be entered in the format "abc-def-hijk". If a user enters "(abc)def-hijk", the computer transaction system may flag an error and direct the user to re-enter the telephone number in the required format.

In even more complex systems, however, errors often may not be discovered upon entry. For example, user input may consist of a program script, with multiple fields and options. Proper syntax (for example, sequence of fields, field widths, and delimiters) are often critical for the script to be properly parsed, and for the program to be properly executed. If a faulty script is executed, errors may not get caught until a downstream operation fails. For example, if a script is executed to provision a new telephone line for a customer, it would be advantageous for administrative software in the switch to directly verify correct provisioning. In many instances, however, correct provisioning may not be verified immediately, and an error in the provisioning process may not get caught until the customer complains of an out-of-service connection. The further downstream an error propagates, the more complex the troubleshooting may become. Downstream errors may also have more extensive consequences. For example, improper provisioning of a switch may cause multiple (including existing) connections to fail. In a worst case scenario, improper provisioning of a switch may cause the entire switch to become inoperative. What is needed is method and apparatus for providing near-real-time verification of user input to control software for systems configuration.

BRIEF SUMMARY OF THE INVENTION

A configuration operation set for configuring a system element is tested by simulating the execution of the control operation set with simulation sample test data. The configuration operation set is received via a configuration user interface in a configuration view. The simulation sample test data is received via a simulation user interface in a simulation view. The simulation sample test data may be automatically generated or manually entered. In an embodiment of the invention, the configuration view and the simulation view may be simultaneously viewed on a single display. In a single session, a control operation set may be received, simulation sample test data may be received, a simulation may be run, and the results of the simulation may be viewed. If the results of the simulation agree with expected results, the control operation set may be saved, and the control operation set may be executed in the system element of interest. If the results of the simulation do not agree with the expected results, the control operation set may be cancelled without affecting the system element of interest. The control operation set may then be debugged.

These and other advantages of the invention will be apparent to those of ordinary skill in the art by reference to the following detailed description and the accompanying drawings.

DETAILED DESCRIPTION

Figure 1:
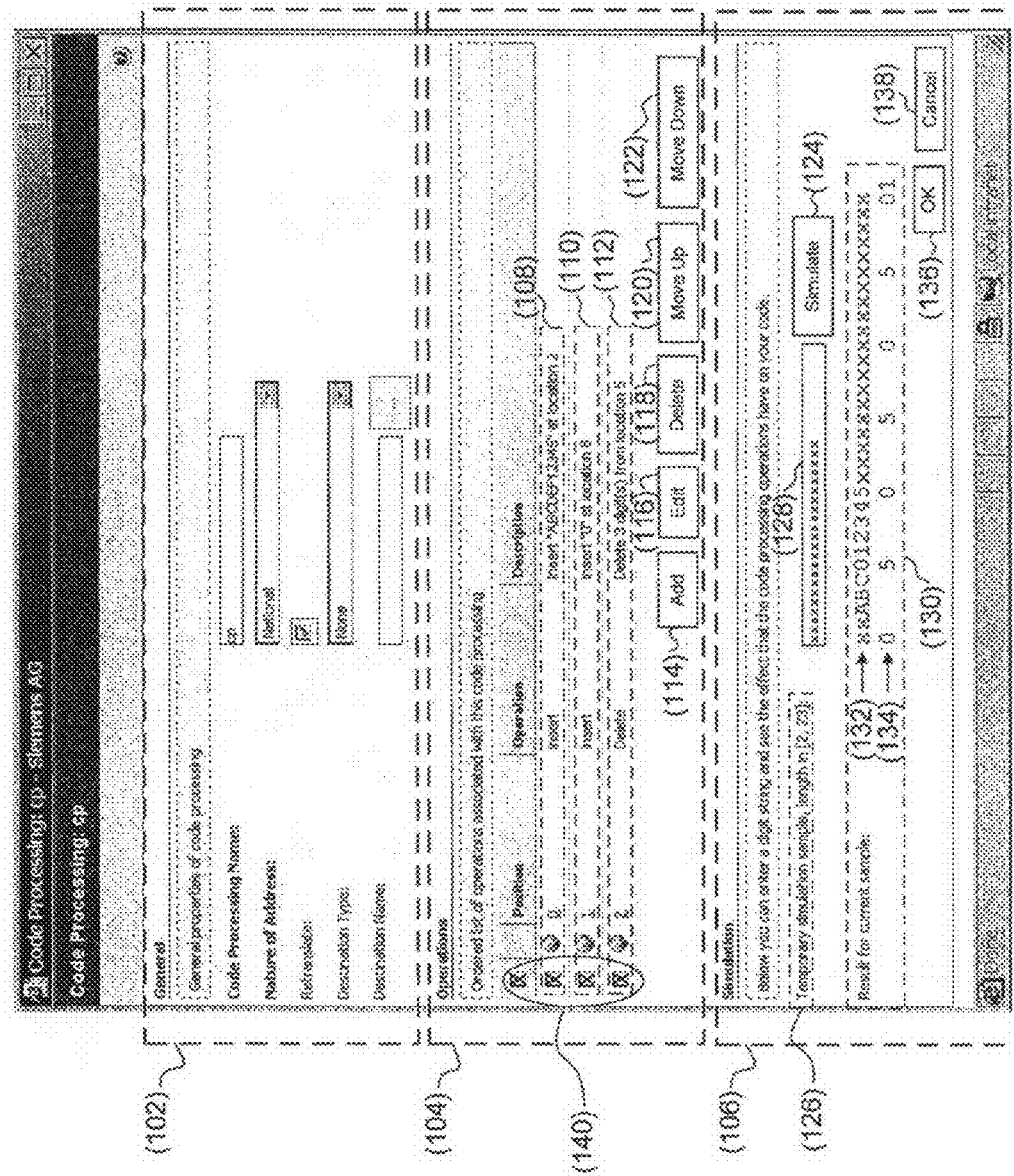
FIG. 1 shows a screenshot of testing a configuration operation set using automatically generated test data.

A system is composed of a set of system elements. Herein, a system element is an entity defined by a user in the context of a user-defined application. A system and a system element may refer to hardware, software, or a combination of hardware and software.

Examples of system elements in a telecommunications system include network subsystems (such as an access network), network equipment (such as a router), and administration software (such as a billing system). Examples of system elements in a medical imaging system include radiation sources (such as an X-Ray unit), positioning equipment (such as servo motors), and image processing software. Examples of system elements in a software system include code modules and objects.

The operation of systems and system elements may be controlled by control software, which includes operating code and input. Herein, input includes input manually entered by a user (for example, a phone number entered into a switch provisioning system), input automatically generated by a physical system element (for example, a temperature reported by a thermal sensor), and input automatically generated by a software system element (for example, average data rate calculated by a statistics module). Control software includes user-definable configuration operations. Herein, a configuration operation set refers to one or more configuration operations. A configuration operation set includes user-defined values of input variables and user-defined operating code. Configuration of a router, for example, may include configuration of ports (transmission protocol and line rate, for example), assignment of Internet Protocol (IP) addresses to the ports, and configuration of routes between ports. Herein, configuration of a system element also refers to configuration of the overall system.

A critical factor in proper systems operation is correct configuration of the system elements. An embodiment of the invention provides fast feedback for testing a configuration operation set before the configuration operation set is executed on the system element of interest. Fast feedback is provided by executing the configuration operation set in a simulation program with simulation sample test data. The simulation program simulates the results that would be generated if the configuration operation set were to be executed in the system element of interest. Verification of the correct operation of the configuration operation set may minimize troubleshooting, may minimize negative impact on the operation of downstream system elements, and may minimize negative impact on the operation of the overall system.

In general, a system element may be configured by entering a configuration operation set into the control software. In general, a configuration operation set may be manually entered by a user, or automatically received by the control software (for example, a configuration operation set automatically generated by a physical system element or a software system element). In an embodiment discussed below, a user manually enters a control operation set via a user interface (UI) at a computer, which may include an input device, such as a keyboard or mouse, and a video display. Further details of a computer are discussed below. One skilled in the art may develop embodiments in which a control operation set is automatically received by the control software.

The user interface, for example, may be a graphical user interface (GUI) or a command-line interface. In an embodiment of the invention, a user may simultaneously observe (on a video display) an integrated configuration view and a simulation view. The configuration view provides the UI for entering the configuration operation set. The simulation view provides the UI for executing a simulation of the configuration operation set, using simulation sample test data. If the simulation results agree with the expected results (known results for a correctly operating configuration operation set), then the user may proceed with executing the configuration operation set in the system element of interest. If the simulation results do not agree with the expected results, then the user may cancel the configuration operation set and debug the configuration operation set. In an embodiment discussed below, the user compares the simulation results with the expected results. One skilled in the art may develop embodiments in which the sample results are automatically compared with the expected results.

FIG. 1 shows an example of a screenshot displaying an integrated configuration and simulation view, according to an embodiment of the invention. The application shown in the example is the configuration of a telecommunications switch. The specific sequence of operations is code processing for the modification (or new entry) of an address in a switching table. In FIG. 1, numerical entries are shown. To avoid confusion between numerical entries and reference numbers, reference numbers are placed between parentheses, such as (102). There are three major groups of fields and function keys: General Group (102), Configuration Operations Group (104), and Simulation Group (106). The configuration view shows General Group (102) and Configuration Operations Group (104). The simulation view shows Simulation Group (106). One skilled in the art may define other configuration views and simulation views. For example, the configuration view may display the lines of code for the configuration operations. As a further example, the configuration view may display details of the system element of interest. The simulation view, for example, may display the run time for the simulation program.

Advantageous embodiments of the invention allow a user to view the configuration view and simulation view simultaneously or in quick succession. In the embodiment shown in FIG. 1, the configuration view and the simulation view are simultaneously displayed on a single display. One skilled in the art may develop other embodiments for displaying the configuration view and the simulation view. For example, a single view may be shown on a display at any given instance. A user may then quickly toggle between the two views. As a further example, the configuration view may be displayed on one display, and the simulation view may be simultaneously displayed on a second display. Advantageous embodiments of the invention allow a user to run the simulation program as an integral part of the overall configuration process. That is, in a single session, a user may enter a configuration operation set, enter simulation sample test data, simulate the control operation set, and rapidly review the simulation results (to compare them with expected results).

General Group (102) contains administrative information on the general properties of the code processing, such as the code processing name and the nature of the address. Configuration Operations Group (104) includes the following fields: Configuration Operation (108)-Configuration Operation (112). The configuration operation set for this example comprises Configuration Operation (108)-Configuration Operation (112). Configuration Operations Group (104) further includes the following function keys: Add (114), Edit (116), Delete (118), Move Up (120), and Move Down (122). To simplify the terminology, herein, "setting up" a configuration operation refers to adding, editing, deleting, moving up, or moving down a configuration operation. The function keys Add (114), Edit (116), and Delete (118) permit a user to add, edit, and delete a configuration operation, respectively. The function keys Move Up (120) and Move Down (122) permit a user to rearrange the sequence (positions) of Configuration Operation (108)-Configuration Operation (112). A configuration operation may be selected for setup via the Check Boxes (140).

Herein, a user activates a function by clicking on the corresponding function key. That is, a user uses a mouse, for example, to place a cursor over the function key and then clicks a mouse button to activate the function. One skilled in the art may develop other embodiments for activating a function. For example, a user may use a keyboard to tab over to the function key, and press "Enter". As a further example, a user may use a keyboard to type in the name of a function in a command line, and press "Enter".

A configuration operation specifies a process to be performed. Configuration Operation (108) specifies the operation [Insert the character string "ABCDEF12345" at location 2 in the address field]. Configuration Operation (110) specifies the operation [Insert the character "0" at location 8 in the address field]. Configuration Operation (112) specifies the operation [Delete 3 digits from location 5 in the address field]. Location in an address field is discussed below.

Simulation Group (106) includes the following fields: Simulation Sample Constraints (126), Simulation Sample (128), and Simulation Results (130). Simulation Group (106) further includes the following function keys: Simulate (124), OK (136), and Cancel (138). In the example shown in FIG. 1, Simulation Sample (128) is test data (character string) automatically generated by a simulator program. Simulation Sample Constraints (126) is imported from the constraints for the corresponding configuration operation. Simulation Sample Constraints (126) are discussed further below.

In the example shown in FIG. 1, the complete sequence of configuration operations in Configurations Group 104 [Configuration Operation (108)-Configuration Operation (112)], are simulated by the simulator program. In another embodiment, a user may select specific configuration operations to be simulated. By default, Simulation Sample (128) is automatically populated with test data. One skilled in the art may develop other embodiments in which a user initially selects whether Simulation Sample (128) is automatically or manually populated.

In one embodiment, for example when the configuration operations are simple, the simulation program may be automatically run once setup of a configuration operation in Configuration Operations Group 104 has been completed. In another embodiment, for example when the configuration operations are complex, the simulation program may be run when a user clicks on the function key Simulate (124). The results of the simulation are displayed in the field Simulation Results (130). Location Field (134) tracks the position in Address Field (132). Note that the values in Location Field (134) start at 0. The value in Location Field (134) corresponds to "location" in Configuration Operation (108)-Configuration Operation (112). As discussed above, in this example, the complete sequence of configuration operations, Configuration Operation (108)-Configuration Operation (112), is simulated. Simulation Sample (128) is automatically populated with the initial character string "xxxxxxxxx . . . ". Configuration Operation (108) inserts the character string "ABCDEF12345" at location 2 in Location Field (134) to yield the intermediate character string "xxABCDEF12345xxxxx . . . ". Configuration Operation (110) then inserts the character "0" at location 8 to yield the intermediate character string "xxABCDEF012345xxxxx . . . ". Configuration Operation (112) then deletes 3 digits from location 5 to yield the final character string "xxABC012345xxxxx . . . ", as correctly shown in Address Field (132) in Simulation Results (130).

In the embodiment shown in FIG. 1, Simulation Results (130) shows the final result after the complete sequence of operations, Configuration Operation (108)-Configuration Operation (112), has been executed. In other embodiments, Simulation Results (130) may show intermediate results. For example, Simulation Results (130) may show three results: the intermediate result after Configuration Operation (108) has been executed; the intermediate result after Configuration Operation (108) and Configuration Operation (110) have both been executed; and the final result after all three operations, Configuration Operation (108)—Configuration Operation (112), have been executed. One skilled in the art may develop embodiments to display other user-defined results.

If Simulation Results (130) displays the expected results, a user may then choose various options. For example, the user may modify the entries in Configuration Operation Group (104) and run another simulation; click on OK (136) to save the configuration specified by Configuration Operation (108)-Configuration Operation (112) and execute the configuration operations in the switch; or click Cancel (138) to end the session without saving the configuration. If Simulation Results (130) do not display the expected results, the user may then modify the entries in Configuration Operation Group (104) and run another simulation (a near-real-time debugging operation); or click Cancel (138) to exit the session. One skilled in the art may specify other user-defined options, depending on Simulation Results (130).

In one embodiment, the user may manually (visually) compare Simulation Results (230) with the expected results. In other embodiments, the simulation program may report a comparison between Simulation Results (230) with the expected results. For example, if Simulation Results (230) matches the expected results, then the simulation program may generate a "Control Operation Set Successful" message. As a further example, if Simulation Results (230) do not match the expected results, then the simulation program may generate a "Control Operation Set Not Successful" message. The simulation program may further highlight the discrepancies between Simulation Results (230) and the expected results.

Figure 2:
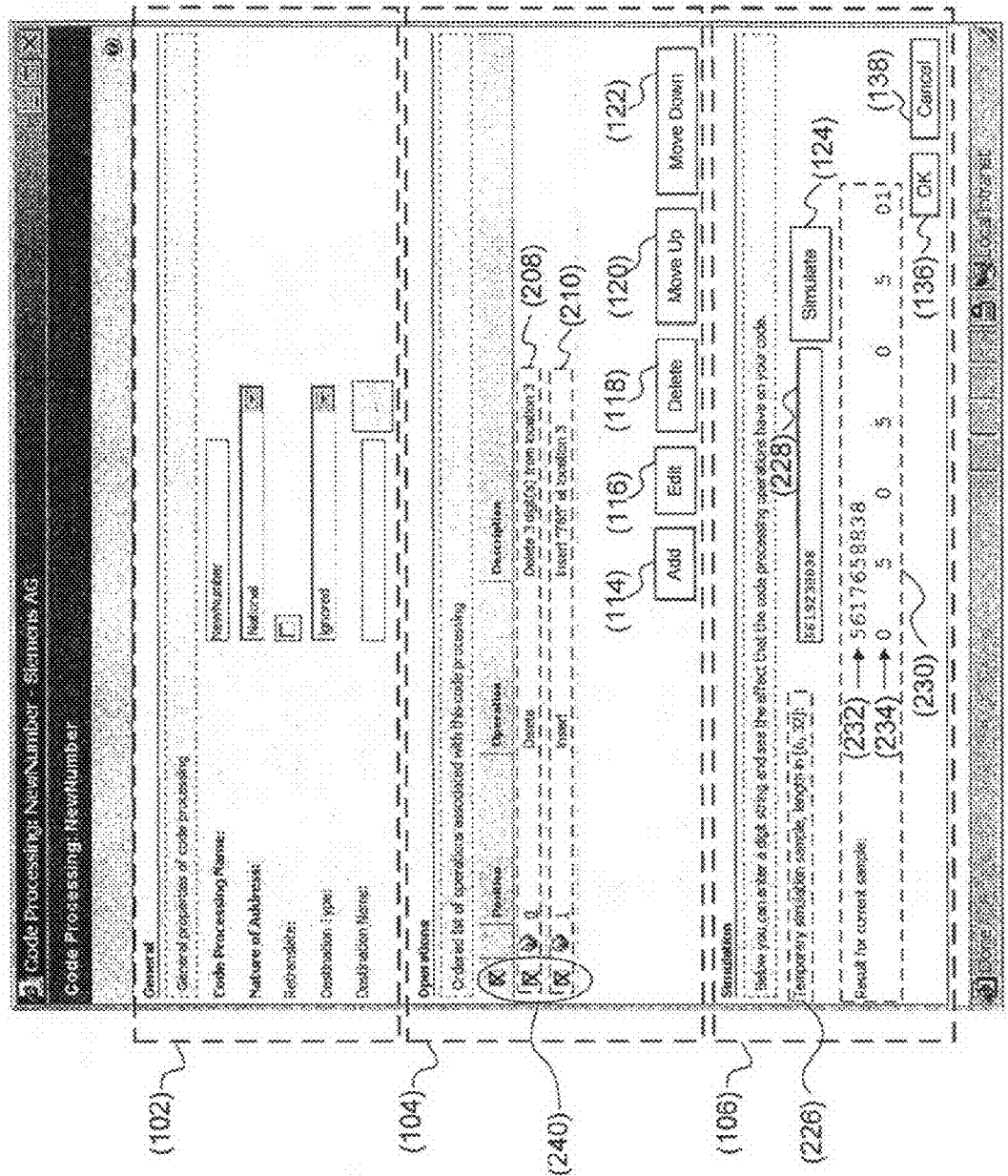
FIG. 2 shows a screenshot of testing a configuration operation set using manual input test data.

FIG. 2 shows an example of a screenshot in which a user manually populates the simulation sample with test data. In FIG. 2, the groups and function keys are the same as those shown in FIG. 1. Their reference numbers (1XX) are the same as the corresponding ones in FIG. 1. Fields in FIG. 2 which are different from the fields in FIG. 1 have the reference numbers (2XX). In the example shown in FIG. 2, there are two configuration operations. Configuration Operation (208) specifies the operation [Delete 3 digits from location 3 in the address field]. Configuration Operation (210) specifies the operation [Insert the character string "765" at location 3 in the address field]. Both operations have been selected for setup via Check Boxes (240). In Simulation Sample (228), a user may manually overwrite the automatically generated test data. In the example shown in FIG. 2, the user has manually entered the character string "5619238838". Simulation Sample Constraints (226) specify the constraints for the test data entered in Simulation Sample (228). In the example shown in FIG. 2, the test data in Simulation Sample (228) must have a minimum string length of 6 characters and a maximum string length of 32 characters. In an embodiment of the invention, the simulation program checks the validity of Simulation Sample (228). That is, the simulation program checks to see whether Simulation Sample (228) satisfies Simulation Sample Constraints (226). If Simulation Sample (228) does not satisfy Simulation Sample Constraints (226), then the simulation program notifies the user of an error condition. The simulation program, for example, may generate an error message. The user may then revise Simulation Sample (228) until Simulation Sample Constraints (226) are satisfied.

In general, constraints herein refer to arbitrary user-defined rules. In an embodiment of the invention, constraints are automatically imported from the configuration operation being simulated. In other embodiments, a user may manually enter constraints. Another example of a constraint is that the characters must comprise digits from 0-7 and be entered in the format xxx-xxx-xxxx. As a further example of a constraint, a simulation sample which is a script must be entered in a user-defined format with user-defined delimiters. In general, if Simulation Sample (228) does not satisfy Simulation Sample Constraints (226), the user may be notified of an error condition by user-defined means. For example, an error message may appear on the screen, Simulation Sample (228) may flash red, or Simulate (124) may be locked out.

After Simulation Sample (228) has been populated with valid test data, the user clicks on Simulate (124). The results of the simulation are displayed in Simulation Results (230). Location Field (234) tracks the position in Address Field (232). The position in Location Field (234) corresponds to "location" in Configuration Operation (208) and Configuration Operation (210). In the example shown in FIG. 2, the combined sequence of Configuration Operation (208) and Configuration Operation (210) is simulated. Simulation Sample (228) is initially populated with the character string "5619238838". Configuration Operation (208) deletes three digits from location 3 to yield the intermediate character string "5618838". Configuration Operation (210) then inserts the digits "765" at location 3 to yield the final character string "5617658838", as correctly shown in Address Field (232). After viewing Simulation Results (230), the user may then exercise the same options as discussed above for the example shown in FIG. 1.

Figure 3:
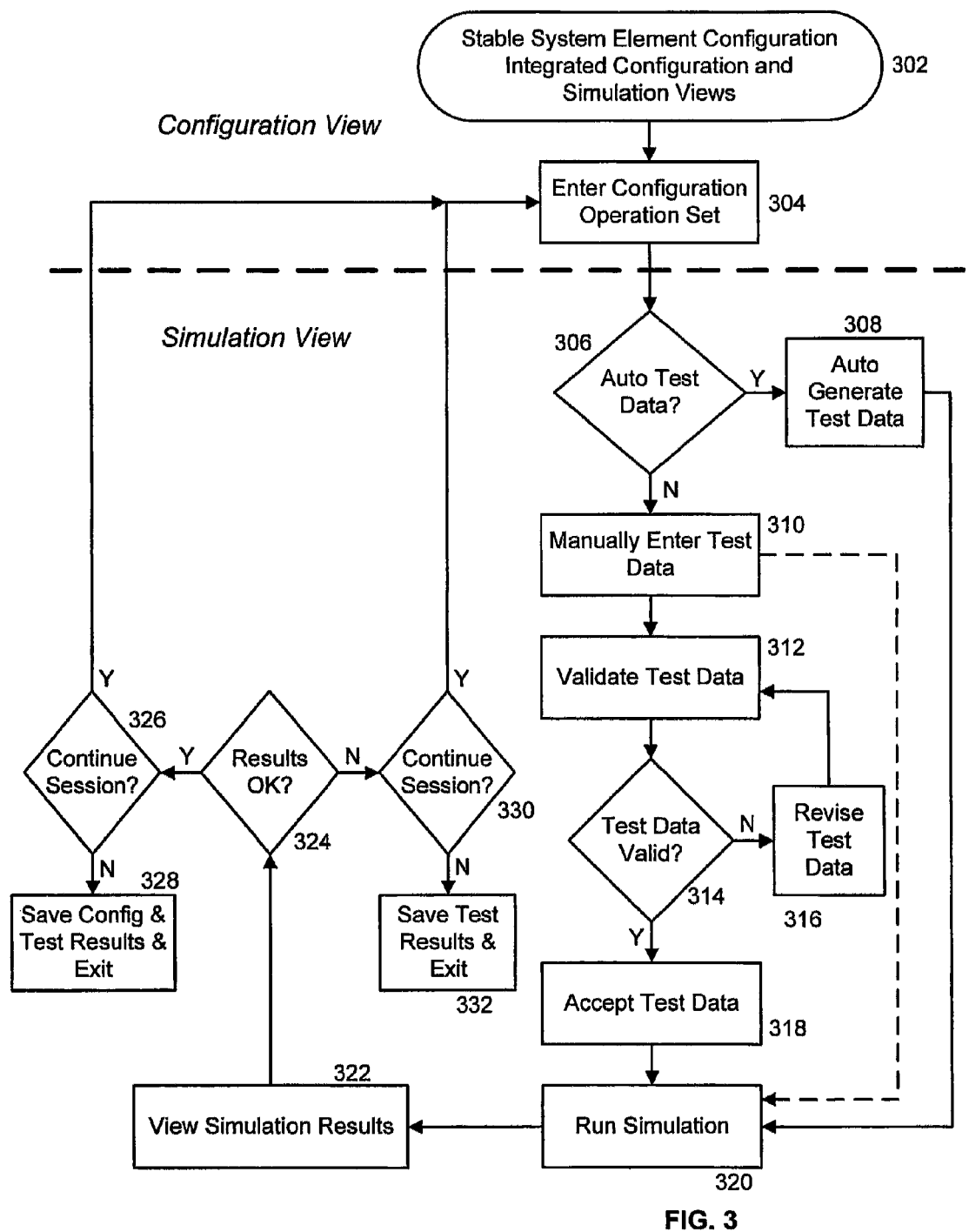
FIG. 3 shows a flowchart of a process for testing a configuration operation set; and, FIG. 4 shows a high-level schematic of a computer which may be used to implement a process for testing a configuration operation set.

FIG. 3 shows a flowchart of the steps for rapid testing of a configuration operation set, according to an embodiment of the invention. Initial state 302 represents a stable system element configuration, details of which may be shown on a display in a configuration view integrated with a simulation view. In step 304, a user enters a configuration operation set (which may be a single configuration operation or a sequence of configuration operations) to be executed. The configuration operation set is entered via a UI in the configuration view. The process then switches to the UI in the simulation view.

In step 306, the user decides whether the simulation is to be run with automatically generated test data or manually entered test data. If automatically generated test data is selected, then the process passes to step 308, in which test data is automatically generated. The process then passes to step 320, in which the simulation is run. If, in step 306, manually entered test data is selected, then the process passes to step 310, and test data is manually entered. In one embodiment, for example when the manually entered test data is simple, the process then passes directly to step 320 (as shown by the dashed connection path), in which the simulation is run. Referring back to step 310, in another embodiment, for example when the manually entered test data is complex, the process then passes to step 312, in which the test data is validated against user-defined constraints. The process then passes to step 314.

If the test data is not valid, then the process passes to step 316, in which the test data is revised. The process then returns to step 312 in which the revised test data is validated. Step 312-step 316 are iterated until the test data is validated. The process then passes to step 318, in which the test data is accepted for the simulation program. The process then passes to step 320, in which the simulation is run. The process then passes to step 322, in which the user views the results of the simulation.

The process then passes to step 324, in which the user checks the simulation results. If the results are correct (that is, matches the expected results), then the process passes to step 326, in which the user decides whether to continue the current session. If the user decides not to continue the current session, then the process passes to step 328, in which the user saves the configuration and test results and exits the session. Referring back to step 326, if the user decides to continue the current session, then the process returns to step 304, in which the user may enter a new configuration operation set.

Referring back to step 324, if the results are not correct (that is, does not match the expected results), the process then passes to step 330, in which the user decides whether to continue the current session. If the user decides not to continue the current session, then the process passes to step 332, in which the user saves the test results and exits the session. Referring back to step 330, if the user chooses to continue the current session, then the process returns to step 304, in which the user may enter a new configuration operation set.

Figure 4:
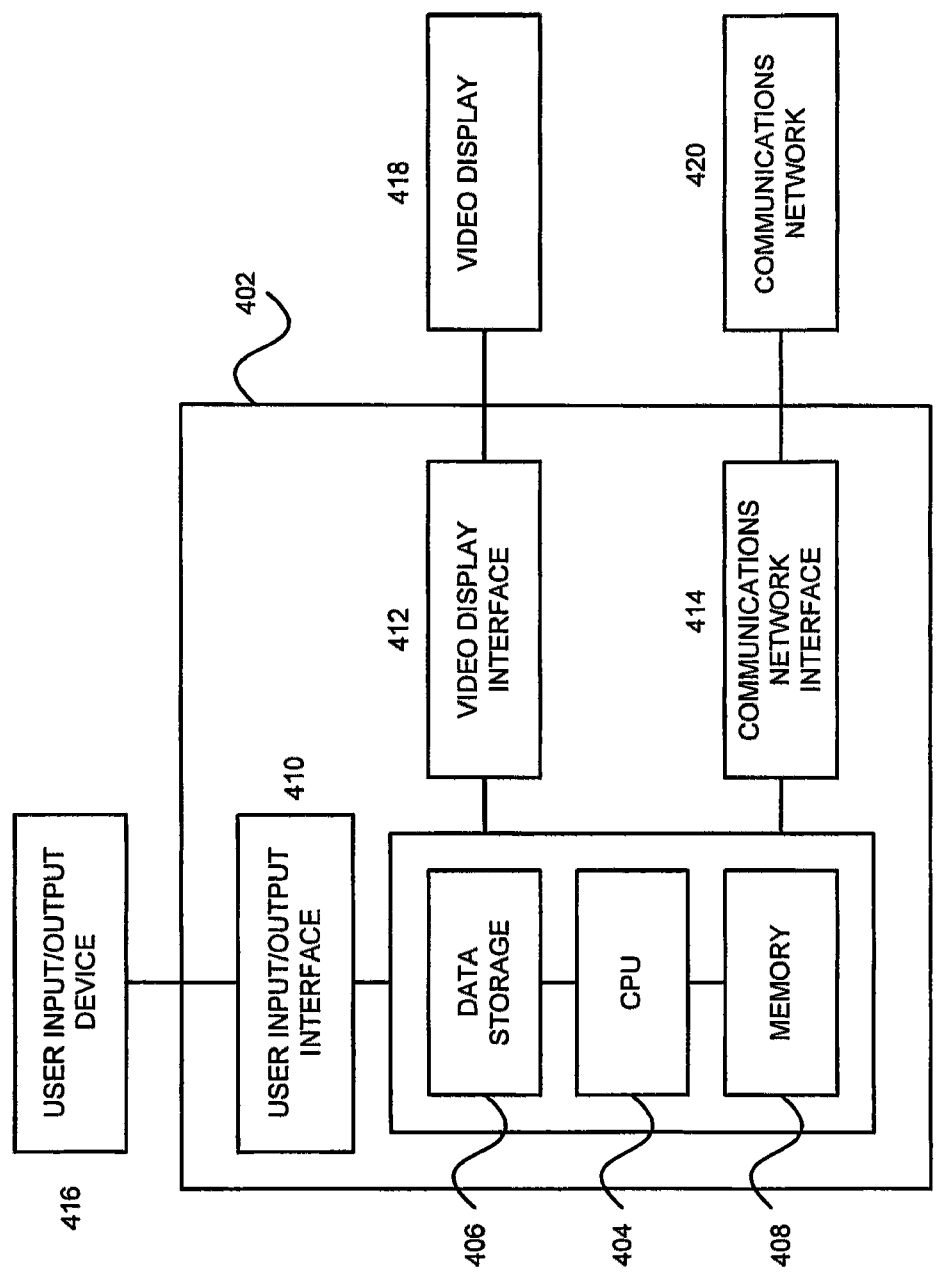

One embodiment of a system for configuring a system element via a UI in a configuration view and simulating the results of the configuration via a UI in a simulation view may be implemented using a computer. As shown in FIG. 4, computer 402 may be any type of well-known computer comprising a central processing unit (CPU) 404, memory 408, data storage 406, and user input/output interface 410. Data storage 406 may comprise a hard drive or non-volatile memory. User input/output interface 410 may comprise a connection to a user input device 416, such as a keyboard or mouse. User input device 416, for example, may be used to click on a function key or manually enter test data, as discussed with respect to the examples shown in FIG. 1 and FIG. 2. As is well known, a computer operates under control of computer software which defines the overall operation of the computer and applications. CPU 404 controls the overall operation of the computer and applications by executing computer program instructions which define the overall operation and applications. The computer program instructions may be stored in data storage 406 and loaded into memory 408 when execution of the program instructions is desired. Computer 402 may further comprise a video display interface 412, which may transform signals from CPU 404 to signals which may drive video display 418. The screenshots shown in FIG. 1 and FIG. 2, for example, may be displayed on video display 418. Computer 402 may further comprise one or more network interfaces. For example, communications network interface 414 may comprise a connection to an Internet Protocol (IP) communications network 420. A system element, such as a router or telecommunications switch, for example, may be connected to communications network 420 and communicate with computer 402. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for testing a configuration operation set for configuring a system element, comprising the steps of:
receiving said configuration operation set via a configuration user interface displayed in a configuration view, wherein the configuration operation set comprises a plurality of configuration operations to be performed in a predetermined sequence;
receiving simulation sample test data via a simulation user interface displayed in a simulation view; and simulating execution of said configuration operation set with said simulation sample test data, wherein said step of simulating generates a simulation result.

2. The method of claim 1, further comprising the step of: simultaneously displaying said configuration view and said simulation view.

3. The method of claim 1, further comprising the step of: comparing said simulation result with an expected result.

4. The method of claim 3, further comprising the step of: if said simulation result agrees with said expected result, configuring said system element with said configuration operation set.

5. The method of claim 3, further comprising the step of: if said simulation result does not agree with said expected result, generating a first error message.

6. The method of claim 1 wherein said step of receiving simulation sample test data further comprises the step of: receiving automatically generated simulation sample test data.

7. The method of claim 1, wherein said step of receiving simulation sample test data further comprises the step of: receiving manually entered simulation sample test data.

8. The method of claim 7, further comprising the step of: checking the validity of said manually entered simulation sample test data.

9. The method of claim 8, further comprising the step of: if said manually entered simulation sample test data is not valid, generating a second error message.

10. An apparatus for testing a configuration operation set for configuring a system element, comprising:
    means for receiving said configuration operation set via a configuration user interface displayed in a configuration view, wherein the configuration operation set comprises a plurality of configuration operations to be performed in a predetermined sequence;
    means for receiving simulation sample test data via a simulation user interface displayed in a simulation view; and
    means for simulating execution of said configuration operation set with said simulation sample test data, wherein said step of simulating generates a simulation result.

11. The apparatus of claim 10, further comprising:
    means for simultaneously displaying said configuration view and said simulation view.

12. The apparatus of claim 10, further comprising:
    means for comparing said simulation result with an expected result.

13. The apparatus of claim 12, further comprising means for:
    configuring said system element with said configuration operation set if said simulation result agrees with said expected result.

14. The apparatus of claim 12, further comprising means for:
    generating a first error message if said simulation result does not agree with said expected result.

15. The apparatus of claim 10, further comprising:
    means for receiving automatically generated simulation sample test data.

16. The apparatus of claim 10, further comprising:
    means for receiving manually entered simulation sample test data.

17. The apparatus of claim 6, further comprising:
    means for checking the validity of said manually entered simulation sample test data.

18. The apparatus of claim 17, further comprising:
    means for generating a second error message if said manually entered simulation sample test data is not valid.

19. A computer readable medium storing computer program instructions for testing a configuration operation set for configuring a system element, said computer program instructions defining the steps of:
    receiving said configuration operation set via a configuration user interface displayed in a configuration view, wherein the configuration operation set comprises a plurality of configuration operations to be performed in a predetermined sequence:
    receiving simulation sample test data via a simulation user interface displayed in a simulation view; and
    simulating execution of said configuration operation set with said simulation sample test data, wherein said step of simulating generates a simulation result.

20. The computer readable medium of claim 19, wherein said computer program instructions further comprise computer program instructions defining the step of: simultaneously displaying said configuration view and said simulation view.

21. The computer readable medium of claim 19, wherein said computer program instructions further comprise computer instructions defining the step of:
    comparing said simulation result with an expected result.

22. The computer readable medium of claim 21, wherein said computer program instructions further comprise computer program instructions defining the step of:
    if said simulation result agrees with said expected result, configuring said system element with said configuration operation set.

23. The computer readable medium of claim 21, wherein said computer program instructions further comprise computer program instructions defining the step of:
    if said simulation result does not agree with said expected result, generating a first error message.

24. The computer readable medium of claim 19, wherein said computer program instructions further comprise computer program instructions defining the step of:
    receiving automatically generated simulation sample test data.

25. The computer readable medium of claim 19, wherein said computer program instructions further comprise computer program instructions defining the step of:
    receiving manually entered simulation sample test data.

* * * * *